Feb. 25, 1936.  T. J. NEWMAN  2,032,301
METER TEST BLOCK
Filed Jan. 20, 1932
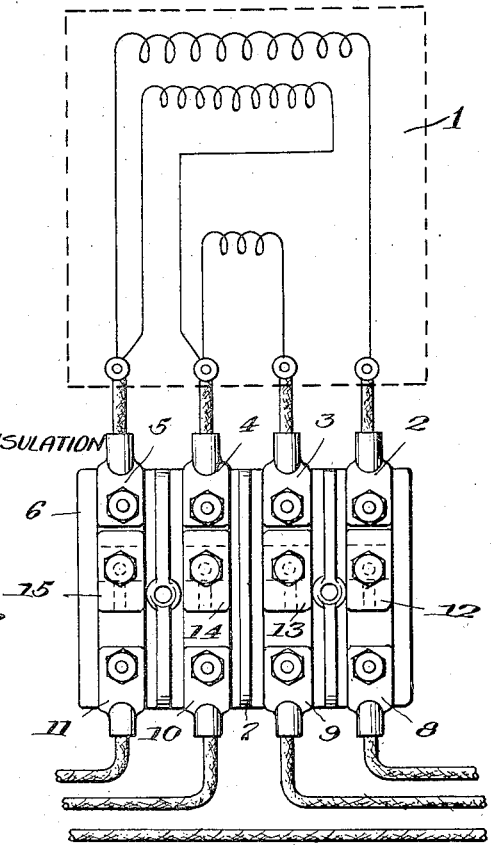
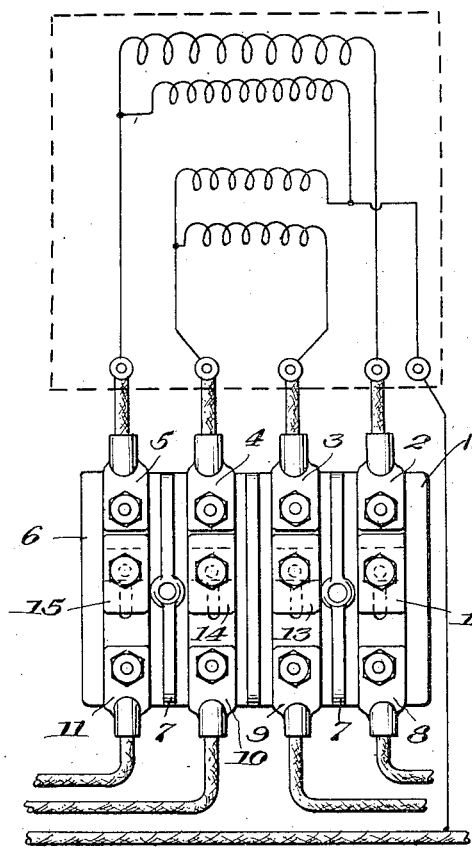
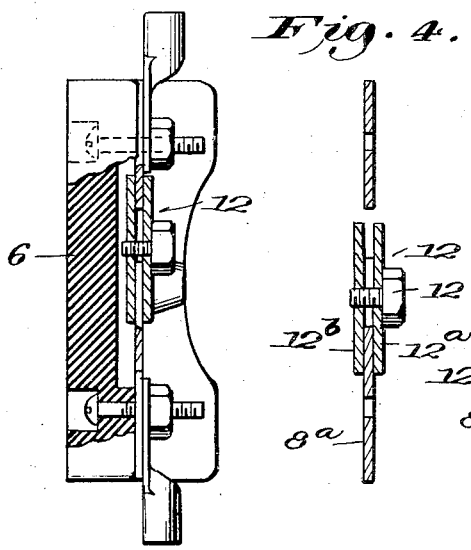
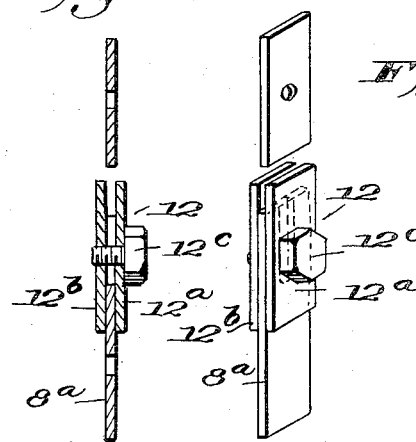
Inventor
Thomas J. Newman
By Edward E. Clement
Attorney Patented Feb. 25, 1936

2,032,301

UNITED STATES PATENT OFFICE 2,032,301

METER TEST BLOCK

Thomas J. Newman, Canton, Ohio

Application January 20, 1932, Serial No. 587,802

7 Claims. (Cl. 200—163)

My invention relates to testing devices and apparatus with particular reference to the testing of meters. The object of my invention is to provide a test block with means to facilitate speed and the disconnection of the meter terminals on the block from the meter. I attain my object by providing a block having sliding links which are normally, when the device is connected up, clamped together by screws so as to form continuous metal terminals extending vertically across the face of the block with the heads of the screws exposed. An insulating socket wrench is used to loosen up each screw clamping the copper parts together. The weight of the sliding links immediately carry them down together with the screws onto the lower terminals leaving a gap between the upper and lower terminals which in practice may conveniently be $\frac{5}{16}$".

My invention is illustrated in the accompanying drawing, in which

Fig. 1 is a front view of my test block together with a diagrammatic representation of a three-wire single phase meter attached thereto.

Fig. 2 is a similar front view of the test block together with a diagrammatic representation of a three-wire three-phase meter attached thereto.

Fig. 3 is a side view of the test block.

Fig. 4 is a sectional view of one pair of terminals and their sliding links detached from the block.

Fig. 5 is a perspective view of the parts of the slide detached.

The meter circuits shown herein form no part of the present invention as such, and therefore they will not be described in detail. Any desired meter circuit may be substituted without departing from the invention, which has to do particularly with means for connecting and disconnecting the meter circuits.

In Fig. 1, 1 represents the meter connected to terminals 2, 3, 4, 5 in the usual or any desired manner. These terminals are secured on the block 6 of insulating material provided with parallel integral separating partitions 7 shaped as shown to prevent any accidental short circuit between the terminals. The upper terminals are lined up vertically with the lower terminals 8, 9, 10, 11 to which are connected the load and service circuits as shown. The lower end of each upper terminal 2, 3, etc. and the upper end of the terminals 8, 9, 10, 11 are flattened to form blades adapted to be connected and disconnected to and from each other by means of the sliding links 12, 13, 14, 15. As best shown in Figs. 4 and 5, these links are double, the link 12 for example comprising an outer member 12a, an inner member 12b, and a screw 12c connecting the two with its head lying on the outside of the member 12a and its threaded stem screwing into the member 12b. The upper end of the blade 8a on the lower terminal, is slotted as shown so that the two members 12a and 12b can slide freely up and down when the screw is loosened.

Referring to Fig. 2, the parts of the test block shown therein are the same as in Fig. 1 heretofore described.

In operation, the sliding links 12, 13, 14, 15 are all raised in their uppermost position as shown in Fig. 2 and their respective screws as 12c are set up tightly to maintain the circuits closed. When it is desired to open the circuit in testing, the socket wrench is applied to the head of each screw and as soon as the latter is loosened it drops instantly to the limit permitted by the slot in the lower blade 8a. The gap between the terminals may then be approximately $\frac{5}{16}$" more or less as already stated. To close the terminals the socket wrench is again applied to the screw heads, is raised up and turned whereupon the circuit is completed.

What I claim is:

1. A test block comprising an insulating base, a pair of circuit terminals carried thereon in vertical alignment with each other and spaced apart vertically, and a vertical sliding link normally connecting said terminals but adapted to be released and to fall by gravity to open the same, said sliding link comprising a pair of parallel members with securing means therefor adapted to draw them together and clamp both ends of the circuit terminals between them.

2. A test block comprising an insulating base, a pair of circuit terminals carried thereon in vertical alignment with each other and spaced apart vertically, and a vertical sliding link normally connecting said terminals but adapted to be released and to fall by gravity to open the same, said sliding link being composed of two parallel members sliding on the circuit terminals and a clamping screw connecting them.

3. An electrical terminal block comprising a base, two conducting fingers mounted on said base with their ends spaced from each other, and a connector mounted on one of said fingers and slidable thereon between circuit opening and circuit closing positions, said connector having two plate portions, one on each side of the finger upon which it slides, and one adapted to connect the ends of the fingers in circuit closing position and a single clamping means for binding said connector plates and fingers into electrical connection when the connector is in circuit closing position.

4. An electrical terminal block comprising a base, two opposing conducting fingers supported on said base, a contact and clamping assembly slidably mounted on one finger and movable into and out of engagement with the other finger between a circuit opening and a circuit closing position, said assembly including two plates one on each side of the finger on which the assembly is movable and a single clamping means for binding said fingers and assembly into electrical connection when in the circuit closing position.

5. An electrical terminal block comprising a base, two conducting fingers mounted on said base with their ends spaced from each other, and a connector slidably attached to one finger and movable thereon into and out of engagement with the other finger, said connector having two plate portions embracing the finger upon which it slides, and a single clamping means for binding said connector and fingers into electrical connection when the connector is engaged with both fingers.

6. An electrical terminal block comprising a base, two conducting fingers mounted on said base with their ends spaced from each other and a connector slidably mounted on one of said fingers, said connector having plates that embrace both sides of the finger upon which it slides, and a single means for clamping said connector and fingers into electrical connection.

7. An electrical terminal block comprising a base, two conducting fingers mounted on said base with their ends spaced from each other, and two plates slidable on one of said fingers, one on each side of the finger upon which it slides, and a single means for binding said plates and fingers into electrical connection in circuit closing position.

THOMAS J. NEWMAN.